United States Patent [19]

Hinz et al.

[11] 3,761,573

[45] Sept. 25, 1973

[54] PRODUCTION OF GRANULAR ALKALI METAL TRIPOLYPHOSPHATE OF HIGH ABRASION RESISTANCE AND HIGH APPARENT DENSITY

[75] Inventors: Arnulf Hinz, Knapsack; Heinz Harnisch, Lovenich, both of Germany

[73] Assignee: Knapsack Aktiengesellschaft, Knapsack near Cologne, Germany

[22] Filed: Feb. 9, 1971

[21] Appl. No.: 114,048

[30] Foreign Application Priority Data
Feb. 24, 1970 Germany................. P 20 08 495.1

[52] U.S. Cl. ............................................. 423/315
[51] Int. Cl. ...................... C01b 15/16, C01b 25/26
[58] Field of Search................. 23/106, 106 A, 107; 423/315

[56] References Cited
UNITED STATES PATENTS

| | | | |
|---|---|---|---|
| 3,160,472 | 12/1964 | Metcalf et al. | 23/106 |
| 3,210,154 | 10/1965 | Klein et al. | 23/107 X |
| 3,437,433 | 4/1969 | Sproul et al. | 23/106 |
| 3,437,434 | 4/1969 | Sproul et al. | 23/106 |

FOREIGN PATENTS OR APPLICATIONS

| | | | |
|---|---|---|---|
| 234,197 | 12/1924 | Great Britain | 23/107 |
| 1,536,511 | 8/1968 | France | 23/107 |

Primary Examiner—Oscar R. Vertiz
Assistant Examiner—Gregory A. Heller
Attorney—Connolly and Hutz

[57] ABSTRACT

Production of granular alkali metal tripolyphosphate of high abrasion resistance and high apparent density. An alkali metal tripolyphosphate of which between 10 and 40 percent of its particles have a size smaller than 0.03 mm, the balance particles having a size of between 0.03 and 0.4 mm, is granulated by spraying an alkali metal orthophosphate solution thereonto; the resulting granules are dried; undersize and oversize particle fractions are separated from the dried granules; and the remaining fraction of particles is annealed at temperatures of between 300 and 600°C.

9 Claims, No Drawings

PRODUCTION OF GRANULAR ALKALI METAL TRIPOLYPHOSPHATE OF HIGH ABRASION RESISTANCE AND HIGH APPARENT DENSITY

The present invention relates to the production of granular alkali metal tripolyphosphate of high abrasion resistance and high apparent density, preferably higher than 750 g/liter.

Granular, non-dusting alkali metal tripolyphosphate, which should substantially resist abrasion during transport or on working it into a blend, is gaining increasing interest in industry for the production of detergents and rinsing agents. Undersize particles, which are necessarily obtained in the production of granular, non-dusting alkali metal tripolyphosphate are accordingly required to be screened off. Unless use is made thereof in special detergents, the undersize material is required to be redissolved and resprayed, or to be used as return material, conditional upon the process employed in a given case.

German published Specification 1 442 992 describes the production of coarsely granular sodium tripolyphosphates of low apparent density, wherein fine particulate sodium orthophosphate of which more than 90 percent of its particles have a size smaller than 0.3 mm in diameter and more than 50 percent of its particles have a size smaller than 0.1 mm in diameter, is granulated by spraying an aqueous alkali metal orthophosphate solution thereonto, and the resulting spray product is heated to temperatures of between 250° and 550°C. The spray water is used in a proportion of between 4 and 30 percent and the solution sprayed in the form of droplets having a size of at most 0.3 mm in diameter.

The spray product consists of hollow beads and is required to be treated under very mild conditions. While on the one hand it is desirable that the product be kept in motion on heating it to temperatures of between 250° and 550°C it is necessary on the other hand to avoid the occurrence of abrasion, pressure and squeezing effects. These, however, are conditions which are very difficult to realize in a commercial process. Granules of low apparent density, even those which are sucessively annealed, are commonly known to have a minor abrasion resistance only and this in combination with a limited stability during transport, which is a result of their hollow bead structure and which is so disadvantageous, particularly on subjecting the granules to finishing treatment. This is the reason why products of high abrasion resistance are gaining increasing interest. In addition thereto, products of high apparent density are required to be used in widespread fields of application.

A further disadvantage resides in the fact that calcined sodium orthophosphate is the starting material in the above process.

The present invention now unexpectedly provides a process for the manufacture of granular alkali metal tripolyphosphate of high apparent density and high abrasion resistance from fine particulate alkali metal tripolyphosphate. This process accordingly enables beneficial use to be made of the above undersize particles of which the uses have been very limited heretofore.

The process of the present invention comprises more particularly granulating an alkali metal tripolyphosphate of which between 10 and 40 percent of its particles have a size smaller than 0.03 mm, the balance particles having a size of between 0.03 and 0.4 mm, by spraying an alkali metal orthophosphate solution thereonto; drying the resulting granules; separating undersize and oversize fractions from the dried granules; and annealing the remaining fraction of particles by heating them to temperatures of between 300° and 600°C. The alkali metal tripolyphosphate used as the starting material in the process should preferably consist of particles of which between 20 and 30 percent have a size smaller than 0.03 mm, and the balance particles have a size of between 0.03 and 0.4 mm.

The starting material should preferably be granulated with the use of an alkali metal orthophosphate solution which contains alkali metal oxide / $P_2O_5$ in a ratio of substantially 1.66, and may also be used for the production of alkali metal tripolyphosphates.

These solutions substantially contain 50 weight percent of dissolved phosphate and are used at a temperature of approximately 90°C.

Following separation of undersize and oversize particles from the particle fraction that is desired to be produced, the oversize particles are preferably crushed, particles of desirable size are separated therefrom once again, and the two fractions of undersize particles are combined with starting material.

By regulating the annealing period and temperature it is possible to establish a given concentration of phase-I or phase-II in the final product. For example, a product containing between 50 and 100 percent of phase-I is obtained by effecting the annealing step over a period of between about 15 and 30 minutes at temperatures of between about 520 and 550°C, and a product containing between 0 and 50 percent of phase-I is obtained by effecting the annealing step over a period of between about 10 and 30 minutes at temperatures of between about 300° and 500°C.

The phase concentration should preferably be stabilized by quenching the hot granules and cooling them down to room temperature.

One of the beneficial effects of the process of the present invention resides in the fact that between 10 and 40 percent of the particles have a fineness of less than 0.03 mm. In other words, the granules then substantially fail to have a hollow bead structure and combine this with higher density.

A further beneficial effect resides in the fact that the spray product remains for a short while only on the granulating disc and accordingly fails to be very closely packed. In other words, the spray product initially is still in the state of plasticity, when delivered to a rotary tube. By intense rotation therein, it is further strengthened and finally has an abrasion resistance greatly excelling that of hollow beads.

A still further beneficial effect resides in the fact that following the drying and screening steps the resulting product is annealed in a separate annealing tube of which the speed of rotation, angle of inclination and degree of filling can be so modified, independently of the drying tube, that a final product of optimum abrasion resistance is produced.

In carrying out the process of the present invention it is necessary to use the tripolyphosphate in the form of particles of which between 10 and 40 percent have a size smaller than 0.03 mm. If use is made of material of which less than 10 percent of its particles have a size smaller than 0.03 mm, the gaps left between the individual particles remain unfilled for lack of fines, and loosely agglomerated particles, which are merely adhered together by the alkali metal orthophosphate spray solution, are obtained. Particulate material having a size larger than that of the fines, which have a particle size of less than 0.03 mm, has a smaller wettable surface, and a substantially smaller proportion of alkali metal phosphate binder solution can accordingly be added thereto until granulation with the result that, while the throughput of a granulating disc is greatly increased for the use of a given nozzle, the agglomerates practically cease to undergo further strengthening in the rotating tube. These latter accordingly have a very minor resistance to abrasion. The reason for this is that the crystals originating from the alkali metal phosphate solution are unable to form firm bridges between the individual particles.

If use is made of material of which more than 40 percent of its particles have a size of less than 0.03 mm, there is an excess of fines, and coarser granules of high density and high abrasion resistance are necessarily produced. If use is made of material containing 40 percent or more of fines, with a size of less than 0.03 mm, then the larger surface of these particles dictates the use of a larger proportion of alkali metal phosphate solution as the binder. As a result of this, the throughput on the disc is diminished for the use of a given nozzle, and oversize granules are required to be crushed, with the resultant formation of 50 percent or more of return material having a size of less than 0.4 mm, for example. While the crushed particles have a high abrasion resistance, the fact remains that the large proportion of undersize return material is unacceptable from an economical point of view. Optimum yields of desirable "primary particles" having a size of between 0.4 and 1.5 mm, for example, are produced by granulation of material of which between 20 and 30 percent of its particles have a size of less than 0.03 mm. The yield normally is between 55 and 65 percent and partially even higher. By subjecting the granules to drying, successively crushing oversize material (between 10 and 30 percent with a size larger than 1.5 mm) and recovering so-called "secondary particles", it is even possible to produce a total yield of desirable particles of between 70 and 80 percent.

Undersize particles are used as return material and directly added to the starting material. This effects improved wettability during granulation and more uniform formation of granules.

A rotary disc should preferably be used as the granulating means. As compared with a double shaft mixer or rotary drum, for example, the rotary disc enables the granulation process to be continuously monitored and corrected, if necessary. If use is made of a double shaft mixer, then it is impossible satisfactorily to influence the size of the resulting granules, for example by varying the speed of rotation or position of the paddles. In addition thereto, material which cakes together on the paddles and is dropped off from time to time effects the formation of coarse lumps. These are merely superficially dried in the rotating tube and they agglutinate the crushing means. If use is made of a rotary drum, the granulation process again is not easy to monitor and control, especially in those cases in which the product is simultaneously dried therein.

On granulating the particulate material by spraying water thereonto by means of a single material nozzle, the particles are more or less rapidly hydrated, this conditional upon the phase concentration in the material to undergo granulation, with the result that the granules are partially subjected to break-up. To attain complete granulation, it would accordingly be necessary, this conditional upon the proportion of particles with a size of less than 0.03 mm, to use between 33 and 38 percent of water, based on the dry substance, and later again to remove the water.

We have further discovered in accordance with our present invention that considerable beneficial effects are produced by replacing the water binder by an alkali metal phosphate solution having a temperature of approximately 90°C and being normally used for the production of tripolyphosphate in a spray tower. For a specific gravity of approximately 1.590 at 90°C, such alkali metal phosphate solution contains substantially 50 weight percent of dissolved substance, based on tripolyphosphate, and contains monoalkali metal phosphate / dialkali metal phosphate in the ratio of 34.4:66.6, corresponding to an alkali metal oxide / $P_2O_5$-ratio of 1.66:1.

Upon spraying such phosphate solution, impinging contact is produced between the individual droplets of the solution and the stream of powder rotating on the disc, and small granules are produced at once. At the same time, the alkali metal orthophosphate contained in each of the individual droplets commences to crystallize therefrom, and the granules are given a firm structure which is further strengthened until removal of the granules from the disc, and this without any need for the tripolyphosphate, that is the real binder, superficially to dissolve in the moist granules, as in water granulation. Between about 30 and 40 weight percent of alkali metal phosphate solution, based on ground tripolyphosphate, is required to be used in the granulation process of the present invention, conditional upon the fineness of the particles to undergo granulation.

In other words, for a concentration of approximately 50 weight percent of substance dissolved in the solution, merely about half as much water is introduced, based on the granulation with water, and the tripolyphosphate is accordingly subject to partial hydration only. The rapid crystallization of orthophosphate from the droplets binding the ground solid material also produces beneficial effects, which reside in an increased formation of primary particles having a size of between 0.4 and 1.5 mm, for example, based on granulation with water, and in the formation of oversize particles having a size of between 2.0 and at most 2.5mm, compared with their normal size of 4 mm in diameter.

As compared with the use of water as the granulating agent, the use of an alkali metal phosphate solution as the binder additionally enables the output of desirable particles to be increased at a rate of between 10 and 20 percent, based on the fine particulate tripolyphosphate. A further advantage resides in the fact that the very same alkali metal phosphate solution can be used, and this in the absence of any additional preparatory treatment, for the production of tripolyphosphate, for example in a spray tower, and as a binder in the granulation process.

While alkali metal phosphate solutions of analogous composition but with higher proportions of dissolved material therein and higher specific gravities, for example 1.645, are indeed easy to spray and even improve the abrasion resistance of the resulting granules, the fact remains that the granules contain more orthophosphate and are therefore required to be left in the rotating tube for longer periods of time. In addition thereto, it is impossible to use such solutions in a spray tower. The steps of drying and annealing the moist granules and the step of simultaneously establishing the phase concentration should conveniently not be effected in a single rotary tube. The reason for this is that uniform phase standardization in all of the individual particle fractions is rendered impossible by the different size of those particles.

The granules discharged from the rotary disc should therefore be dried in a rotating tube, oversize material screened off and crushed, and merely the particle fraction of desirable size, for example that of a size of between 0.4 and 1.5 mm, annealed in a second rotating tube. It is possible in this way to modify the speed of rotation and angles of inclination of the tubes as well as the temperatures and residence times in the two tubes, independently of one another.

The abrasion resistance can be determined by two different methods. In one of these, the drum test, 50 grams of granules having a size of between 0.4 and 0.8 mm are rolled for 5 minutes and together with 8 steel balls of 20 mm in diameter in a small cylindrical drum. The drum has a diameter of 114 mm, a depth of 100 mm, and rotates at a speed of 100 rpm. The material retained on a 0.4 mm test sieve, expressed in weight percent, is an index of the abrasion resistance.

In the sieve test, 100 grams of granules having a size of between 0.4 and 0.8 mm are placed together with 35 steel balls with a diameter of 15 mm and a total weight of 495 grams on a 0.4 mm test sieve of 200 mm in diameter, and horizontally yet eccentrically vibrated thereon for a 10 minute period at 160 rpm and a 30 mm breadth of oscillation. Here again, the material retained on sieve, expressed in weight percent, in an index of the resistance to abrasion.

The rate of hydration is determined by the ROH-test (rate of hydration test). 200 milliliters of water are placed in a Dewar vessel, heated therein to a temperature higher than 80°C. and 50 grams of $Na_2SO_4$ are added. The salt is allowed to dissolve and the whole is cooled. As soon as the cooling curve transverse the 80°C line, there are added 150 grams of tripolyphosphate and the temperature increase is measured. A product is qualified as good when a temperature of between 89° and 90°C is reached after 1 minute.

EXAMPLE 1

The starting material was fine particulate sodium tripolyphosphate containing 30 percent of return material, and the binder was a sodium phosphate solution which had a specific gravity of 1.595 at 90°C and contained $Na_2O/P_2O_5$ in the molar ratio of 1.66.

Structure of particles:
a. Sodium tripolyphosphate free from return material
b. Sodium tripolyphosphate with 30 percent of return material Retained on sieve:

| | a) | b) |
|---|---|---|
| 0.3 mm | 1.2 weight percent | 6.3 weight percent |
| 0.2 mm | 7.6 weight percent | 20.6 weight percent |
| 0.1 mm | 37.7 weight percent | 43.6 weight percent |
| 0.06 mm | 50.5 weight percent | 60.2 weight percent |
| 0.03 mm | 68.8 weight percent | 82.0 weight percent |
| < 0.03 mm | 31.2 weight percent | 18.0 weight percent |

The granulation was effected on a rotary disc, which had a diameter of 1,000 mm, was inclined through an angle of 62°, with respect to the horizontal, and rotated at a speed of 22 rpm.

The phosphate solution was sprayed under a pressure of 3 atmospheres gauge by means of a single material spray nozzle with an orifice of 1.6 mm in diameter.

The throughput was 1.306 kg/min. = 0.815 l/min.

The operation period was 6 hours and 49 minutes. 1.416 kg of tripolyphosphate with 30 percent of return material and 534 kg of Na-phosphate solution were put through, and 1.950 kg of moist granules, corresponding to 286 kg/hour, were obtained.

Based on the sodium tripolyphosphate, there were needed 37.7 weight percent of sodium phosphate solution, from which a further 18.35 weight percent of sodium tripolyphosphate was formed, corresponding to the proportion of solid matter dissolved therein.

The moist granules discharged from the rotary disc were dried in a heated rotary tube which had a diameter of 500 mm and a length of 2 000 mm, rotated at a speed of 12 rpm and was not inclined. The granulation temperature near the discharge end was between 180° and 200°C.

Particles with a size of between 0.4 and 1.5 mm (primary particles) were sieved out for calcination. Oversize particles were crushed in a hammer mill and particles with a size of between 0.4 and 1.5 mm (secondary particles) were sieved out. The undersize particles with a size of less than 0.4 mm, which were obtained in the two cases, were used as return material and added to the starting material.

Primary particles were obtained in a yield of 57 weight percent. With the inclusion of the secondary particles the total yield was 68 weight percent, based on the starting material.

Calcination and phase standardization were effected in a second rotary tube which rotated at a speed of 8 rpm, had dimensions the same as those of the drying tube, and was fitted with inserts to ensure thorough mixing and uniform distribution of the temperature in the rotating granules. The granules were allowed to remain therein over a period of 20 minutes and then had a temperature of 540°C.

The hot granules were quenched and successively cooled down to room temperature, in a cooling tube.

The finished granules had the following properties:

| | |
|---|---|
| Phase-content: | 56 weight percent of phase-I. |
| Abrasion: | Drum test: residue on 0.4 mm sieve: 50 weight percent |
| | Sieve test: residue on 0.4 mm sieve: 90.5 weight percent |
| Rate of hydration: (ROH-test) | cent after 1 minute: 89.1°C |
| | after 5 minutes: 91.9°C(max. temperature) |
| Apparent density: | 890 grams/liter. |

EXAMPLE 2

The starting material was fine particulate sodium tripolyphosphate containing 30 weight percent of return material, and the binder was a sodium orthophosphate solution which had a specific gravity of 1.620 at 90°C and contained $Na_2O/P_2O_5$ in the molar ratio of 1.66.

Structure of particles:
a. Sodium tripolyphosphate
b. Sodium tripolyphosphate with 30 percent return material.

Retained on sieve:

| | a) | b) |
|---|---|---|
| 0.3 mm | 0.5 weight percent | 12.4 weight percent |
| 0.2 mm | 3.9 weight percent | 26.3 weight percent |
| 0.1 mm | 25.2 weight percent | 45.1 weight percent |
| 0.06 mm | 36.0 weight percent | 55.0 weight percent |
| 0.03 mm | 63.0 weight percent | 74.7 weight percent |
| < 0.03 mm | 37.0 weight percent | 25.3 weight percent |

The granulating disc and nozzle were the same as those used in Example 1.

The throughput rate was 1.215 kg/minute = 0.750 liter/minute, and the operation period was 6 hours and 42 minutes.

1.276 kg of sodium tripolyphosphate containing 30 percent of return material and 488 kg of sodium phosphate solution were put through within this period, and 1.764 kg. of moist granules, corresponding to 263 kg/hour, were obtained.

38.3 Weight percent of sodium phosphate solution, corresponding to 19.8 weight percent of sodium tripolyphosphate, were required to be used, based on the material to undergo granulation.

The granules were dried and sieved and the following fractions were obtained.

| Primary particles: | 63 weight percent |
|---|---|
| Total yield of particles: | 75 weight percent. |

The granules were annealed at 540° to 560°C and a final product having the following properties was obtained:

Phase-I: 76 weight percent
Abrasion:
   Drum test: residue on 0.4 mm sieve: 47 weight percent
   Sieve test: residue on 0.4 mm sieve: 89.5 weight percent
Rate of hydration (ROH-test): after 1 minute: 94.6°C after 2½ minutes: 94.8°C (max. temperature)
Apparent density: 894 grams/liter.

EXAMPLE 3

The starting materials were fine particulate sodium tripolyphosphate containing 25 weight percent of return material and a sodium phosphate solution, which had a specific gravity of 1.620 at 90°C, was used at a temperature of 98°C and contained $Na_2O/P_2O_5$ in the molar ratio of 1.66.

Structure of particles:
a. Sodium tripolyphosphate
b. Sodium tripolyphosphate with 25 percent of return material.

Retained on sieve:

| | a) | b) |
|---|---|---|
| 0.3 mm | 0.7 weight percent | 10.1 weight percent |
| 0.2 mm | 5.3 weight percent | 22.9 weight percent |
| 0.1 mm | 22.1 weight percent | 39.9 weight percent |
| 0.06 mm | 34.5 weight percent | 48.9 weight percent |
| 0.03 mm | 55.2 weight percent | 69.1 weight percent |
| < 0.03 mm | 44.8 weight percent | 30.9 weight percent |

The granulating disc was the same as that used in Example 1.

The nozzle had on orifice of 1.6 mm in diameter. 1.288 kg/minute = 0.795 liter/minute was put through over a period of 6 hours and 48 minutes. The quantity of material put through within that period of time accordingly was 1.533 kg of sodium tripolyphosphate with 25 percent of return material and 526 kg of sodium phosphate solution, and 2.059 kg of moist granules, corresponding to 303 kg/hour, were obtained.

34.3 Weight percent of sodium phosphate solution were required to be used, based on the material to undergo granulation. This corresponded to 17.7 weight percent of solid tripolyphosphate.

The granules were dried and sieved, and the following fractions were obtained:

| Primary particles: | 70 weight percent |
|---|---|
| Total yield of particles: | 85 weight percent. |

The fraction consisting of particles with a size of between 0.4 and 1.5 mm was annealed over three different periods of time in a rotary tube at a granulation temperature of between 540° and 560°C.

RESULTS a. Throughput 84 kg/hour. The rotary tube was fed with 40 kg of material. This gave a sojourn time of 28 minutes and 30 seconds.

Phase-I: 100 weight percent
Abrasion: Drum test: residue on 0.4 mm seive: 75.2 weight percent
   Sieve test: residue on 0.4 mm sieve: 96.5 weight percent
Rate of hydration: after 1 minute: 95.5°C
(ROH-test)
   after 2½ minutes: 95.9°C (max. temperature)
Apparent density: 949 grams/liter.

b. Throughput 108 kg/hour; sojourn time 22 minutes and 18 seconds.

Phase-I: 85 weight percent
Abrasion: Drum test: residue on 0.4 mm sieve: 71 weight percent
   Sieve test: residue on 0.4 mm sieve: 96.5 weight percent
Rate of hydration after 1 minute: 95.5°C
(ROH-test)
   after 2½ minutes: 95.9°C (max. temperature)
Apparent density: 940 grams/liter.

c. Throughput 144 kg/hour; sojourn time 16 minutes and 42 seconds.

Phase-I: 75 weight percent
Abrasion: Drum test: residue on 0.4 mm sieve: 65.2 weight percent
   Sieve test: residue on 0.4 mm sieve: 94.6 weight percent
Rate of hydration after 1 minute: 91.6°C
(ROH-test)
   after 2½ minutes: 92.1°C (max. temperature)
Apparent density: 942 grams/liter.

We claim:

1. In the process for granulating finely divided alkali metal tripolyphosphate by mixing the said tripolyphosphate with alkali metal orthophosphates and subjecting the resulting product to temperature sufficient to effect the conversion of the alkali metal orthophosphates to alkali metal tripolyphosphate the improvement comprising the steps of
   a. charging an alkali metal tripolyphosphate of which between 10 and 40 percent of its particles have a size smaller than 0.03 mm, the balance of the particles having a size between 0.03 and 0.4 mm
   b. keeping in rotatory motion the said tripolyphosphate while spraying thereonto the said orthophosphates in the form of a solution with the resultant formation of shaped moist granules
   c. then drying the said moist granules by trundling it through a heated rotating inclined tube
   d. thereafter separating undersize and oversize particle fractions from the dried granules and e. finally annealing the remaining desired fraction of particles at temperatures between 300° and 600°C whereby a granulate alkali metal tripolyphosphate of high abrasion resistance and an apparent density of more than 750 g/l is obtained.

2. The process as claimed in claim 1, wherein between 20 and 30 percent of the alkali metal tripolyphosphate particles have a size of less than 0.03 mm, the balance particles having a size of between 0.03 and 0.4 mm.

3. The process as claimed in claim 1, wherein the alkali metal orthophosphate solution used to effect granulation contains alkali metal oxide / $P_2O_5$ in a molar ratio of approximately 1.66.

4. The process as claimed in claim 1, wherein the alkali metal orthophosphate solution used for granulation contains approximately 50 weight percent of dissolved phosphate.

5. The process as claimed in claim 1, wherein the alkali metal orthophosphate solution used for granulation is used at a temperature of approximately 90°C.

6. The process as claimed in claim 1, wherein undersize and oversize particles are separated from the fraction of particles desired to be produced, the oversize particles are crushed, particles of desirable size are separated therefrom, and the two fractions of undersize particles are combined with starting material.

7. The process as claimed in claim 1, wherein a concentration of between 50 and 100 percent of phase-I is established by effecting the annealing step over a period of between about 15 and 30 minutes at temperatures of between about 520° and 550°C.

8. The process as claimed in claim 1, wherein a concentration of between 0 and 50 percent of phase-I is established by effecting the annealing step over a period of between about 10 and 30 minutes at temperatures of between about 300° and 500°C.

9. The process as claimed in claim 1, wherein the hot granules are quenched and successively cooled down to room temperature, to stabilize the phase-concentration therein.

* * * * *